United States Patent [19]

Noguchi et al.

[11] Patent Number: 5,734,801
[45] Date of Patent: Mar. 31, 1998

[54] METHOD OF AND APPARATUS FOR PRODUCING COLOR PROOF

[75] Inventors: Takafumi Noguchi, Minami-ashigara; Yoshifumi Dounomae; Wataru Ito, both of Kanagawa-ken, all of Japan

[73] Assignee: Fuji Photo Film Co., Ltd., Kanagawa, Japan

[21] Appl. No.: 580,189

[22] Filed: Dec. 28, 1995

[30] Foreign Application Priority Data

Dec. 28, 1994 [JP] Japan .................. 6-327922
Jan. 17, 1995 [JP] Japan .................. 7-005257
Feb. 3, 1995 [JP] Japan .................. 7-017095

[51] Int. Cl.$^6$ .................. G06K 15/00; H04N 1/46
[52] U.S. Cl. .................. 395/109; 358/518; 358/504; 358/534; 358/535
[58] Field of Search .................. 395/109, 101, 395/112; 358/518, 534, 535, 504, 501, 503; 382/167, 162; 347/115, 133, 188, 191, 193, 221, 232, 236, 246, 19, 16, 105, 14

[56] References Cited

U.S. PATENT DOCUMENTS

| | | | |
|---|---|---|---|
| 4,399,749 | 8/1983 | Arai | 358/503 |
| 4,847,638 | 7/1989 | Moriyama | 347/14 |
| 5,276,459 | 1/1994 | Danzuka et al. | 347/19 |
| 5,475,509 | 12/1995 | Okamoto | 358/534 |
| 5,504,506 | 4/1996 | Noaki | 347/14 |
| 5,508,826 | 4/1996 | Lloyd et al. | 358/518 |
| 5,530,563 | 6/1996 | Zimmerman et al. | 358/518 |
| 5,596,353 | 1/1997 | Takeda et al. | 347/19 |

FOREIGN PATENT DOCUMENTS

| | | | |
|---|---|---|---|
| 621723A2 | 10/1994 | European Pat. Off. | H04N 1/40 |
| 3199053 | 8/1991 | Japan | B41J 2/205 |
| 4060546 | 2/1992 | Japan | G03D 13/00 |

Primary Examiner—Dwayne Bost
Assistant Examiner—Tracy M. Legree
Attorney, Agent, or Firm—Sughrue, Mion, Zinn, Macpeak & Seas, PLLC

[57] ABSTRACT

Halftone-dot area percentage data generated from an image document for at least three plates including three primaries are converted into respective bit map data with referring to respective threshold matrix. The bit map data are simultaneously referred to with respect to each of the pixels of a color printer which is to output a color proof, and thereby the area percentages are counted. Then, predetermined colorimetric data of the respective colors are processed by the area percentages as weighting coefficients, and the average tristimulus value data are calculated. The calculated tristimulus value data are used as pixel data of input image data of the color printer.

12 Claims, 12 Drawing Sheets

FIG. 5

| $d_{11}$ ($d_{ij}$) | | | | AF | | | | |
|---|---|---|---|---|---|---|---|---|
| 4 | 10 | 16 | 20 | 22 | 20 | 16 | 10 | 4 |
| 10 | 25 | 40 | 50 | 55 | 50 | 40 | 25 | 10 |
| 16 | 40 | 64 | 80 | 88 | 80 | 64 | 40 | 16 |
| 20 | 50 | 80 | 100 | 110 | 100 | 80 | 50 | 20 |
| 22 | 55 | 88 | 110 | 121 | 110 | 88 | 55 | 22 |
| 20 | 50 | 80 | 100 | 110 | 100 | 80 | 50 | 20 |
| 16 | 40 | 64 | 80 | 88 | 80 | 64 | 40 | 16 |
| 10 | 25 | 40 | 50 | 55 | 50 | 40 | 25 | 10 |
| 4 | 10 | 16 | 20 | 22 | 20 | 16 | 10 | 4 |

| PRINT SHEET | PRINTEING INK | PARAMETER |
|---|---|---|
| WOOD-FREE PAPER | A | ±9.0 |
| ART PAPER | B | ±6.0 |
| COAT PAPER | C | ±4.0 |
| ⋮ | ⋮ | ⋮ |

METHOD OF AND APPARATUS FOR PRODUCING COLOR PROOF

BACKGROUND OF THE INVENTION

1. Field of the Invention

The present invention relates to a method of and an apparatus for producing a color proof with either a color printer which forms pixel images on a sheet according to a density gradation process or a color display monitor which forms pixel images on a display panel according to a luminance modulation process, before a printed color document of a half-tone dot image is produced by a color printing press such as rotary presses or the like.

2. Description of the Related Art

It has heretofore been customary to produce a color proof for examining and correcting colors before a printed color document of a halftone dot image is produced by a color printing press.

Color printers are used to produce color proofs because the color printers are relatively simple in structure and inexpensive to manufacture and can produce hard copies with images formed on sheets a plurality of times in a short period of time since, as well known in the art, they do not need the production of process-plate films and presensitized plates which are required by color printing machines.

FIG. 12 of the accompanying drawings shows the sequence of a conventional process of producing a color proof.

According to the conventional process of producing a color proof, as shown in FIG. 12, an image on an image document 2 is read by an image reader such as a color scanner having a CCD area sensor or the like, and gradation image data Ia of each of the colors R (red), G (green), and B (blue) are generated from the read image in a step S1.

Then, the RGB gradation image data Ia are converted by a color conversion process into halftone-dot area percentage data aj of the four plates of respective colors C (cyan), M (magenta), Y (yellow), and K (black), where j=0~3 (0 represents the color C, 1 the color M, 2 the color Y, and 3 the color K) in a step S2. The color conversion process has various versions corresponding to different color printing machines, and those versions are based on know-hows of various printing companies depending on their color printing machines.

Images on printed color documents produced by the color printing machines are halftone-dot images. To produce a printed color document actually, halftone-dot area percentage data aj produced by a color conversion process in the step S2 are developed into bit map data, and a process-plate film or the like is generated based on the bit map data. Generally, the process of generating process of the process-plate films and the presensitized plates is considerably complicated because a plurality of such machines as a photographic exposing machine and an automatic developing machine are required.

In order to facilitate the production of a color proof CPa, a digital color printer (DP) 3 is employed. The DP 3 forms an image on a donor film by digitally controlling the intensity and time of emission of LED (light-emitting diode) light or a laser beam per pixel, and transfers the image from the donor film to an image-receiving sheet to form the image thereon. The DP 3 is much more inexpensive than a color printing machine which generates printing plates and produces a printed color document with the printing plates. The DP 3 is also smaller in volume and lighter in weight.

In order to employ the DP 3, it is necessary to convert the halftone-dot area percentage data aj of the four plates C, M, Y, K produced in the step S2 into image data (called "common color space data") independent of devices including a printing device, a CRT, a photographic device, an LED, etc., e.g., tristimulus value data X, Y, Z.

Therefore, the halftone-dot area percentage data aj of the four plates C, M, Y, K are converted into tristimulus value data X, Y, Z by a image data processing in a step S4. The image data processing may be carried out by a process which uses the Neugebauer's equation, for example.

Prior to the step S4, colorimetric data $X_i$, $Y_i$, $Z_i$ (i represents $2^4=16$ colors for the four plates C, M, Y, K, i=0~15) for the colors of printing inks are measured by a colorimeter in a step S3. For measuring the colorimetric data $X_i$, $Y_i$, $Z_i$, the 16 colors are printed on a print sheet which will be used to produce a printed color document by a color printing machine. The 16 colors correspond to the presence and absence of the respective colors C, M, Y, K, which represent a combination of $2^4=16$ colors.

Specifically, the 16 colors include the color W (white) which is present when nothing is printed on the print sheet, the primary colors C, M, Y, the color K (black), and the mixed colors C+M, C+Y, C+K, M+Y, M K, Y+K, C+M+Y, C+M+K, C+Y+K, M+Y+K, and C+M+Y+K. The colors of reflections from the colors printed on the print sheet are measured by a colorimeter such as a spectrometer, for example, thereby producing the colorimetric data $X_i$, $Y_i$, $Z_i$.

According to the process which uses the Neugebauer's equation, the colorimetric data $X_i$, $Y_i$, $Z_i$ are multiplied by a coefficient of halftone-dot area percentage data $b_i$ (i=0~15), as shown below, thus producing the tristimulus value data X, Y, Z in the step S4.

$$X = \Sigma b_i \cdot X_i,$$

$$Y = \Sigma b_i \cdot Y_i, \text{ and}$$

$$Z = \Sigma b_i \cdot Z_i \quad (1)$$

The halftone-dot area percentage data $b_i$ of the 16 colors are determined from the halftone-dot area percentage data aj by the following probability calculating equations (2):

$$b0 = (1-c)(1-m)(1-y)(1-k),$$

$$b1 = c \cdot (1-m)(1-y)(1-k),$$

$$b2 = (1-c) \cdot m \cdot (1-y)(1-k),$$

$$b3 = c \cdot m \cdot (1-y)(1-k),$$

$$b4 = (1-c)(1-m) \cdot y \cdot (1-k),$$

$$b5 = c \cdot (1-m) \cdot y \cdot (1-k),$$

$$b6 = (1-c) \cdot m \cdot y \cdot (1-k),$$

$$b7 = c \cdot m \cdot y \cdot (1-k),$$

$$b8 = (1-c)(1-m)(1-y) \cdot k,$$

$$b9 = c \cdot (1-m)(1-y) \cdot k,$$

$$b10 = (1-c) \cdot m \cdot (1-y) \cdot k,$$

$$b11 = c \cdot m \cdot (1-y) \cdot k,$$

$$b12 = (1-c)(1-m) \cdot y \cdot k,$$

$$b13 = c \cdot (1-m) \cdot y \cdot k,$$

$$b14 = (1-c) \cdot m \cdot y \cdot k, \text{ and}$$

$$b15 = c \cdot m \cdot y \cdot k \quad (2)$$

In the equation (2), the halftone-dot area percentage data aj (j=0~3) are replaced with a0=c, a1=m, a2=y, a3=k for an intuitive understanding where c, m, y, k represent halftone-dot area percentage data for the respective plates. In the equation (2), b3, for example, represents the area percentage data for the color C+M, which can be determined by the probabilistic multiplication of the probability c that the plate C is present, the probability m that the plate M is present, the probability (1−y) that the plate Y is not present, and the probability (1−k) that the plate K is not present. Therefore, the Neugebauer's equation (1) can be interpreted as an equation based on a theory of probability.

The tristimulus value data X, Y, Z generated according to the equation (1) are supplied to the DP 3. The DP 3 converts the tristimulus value data X, Y, Z into data of the three primaries with respect to the LED or the like, i.e., image data depending on the devices, which may also be called inherent color space data, based on a look-up table (LUT), and generates the color proof CPa, which is a hard copy with an image formed on a sheet, based on the image data.

In the case where the tristimulus value data X, Y, Z for the DP 3 are generated according to the Neugebauer's equation, the colors of a printed color document to be produced can accurately be reproduced in the image on the hard copy because the colorimetric data measured by a colorimeter as representing the colors of an image to be formed on the printed color document by the color printing machine are employed. However, since a recording medium composed of print sheets and printing inks that are used by the DP 3 is different from recording mediums which are normally used by actual color printing machines, it has been impossible to reproduce the same finish as that of the printed color document on the color proof CPa.

Specifically, various sheets which are available for use as printed color documents include sheets of art paper, coat paper, wood-free paper, etc., that are used depending on applications, and have different surface textures and exhibit different manners in which printing inks are spread thereon. There are also available different types of printing inks which present different finishes in relation to sheets for use as printed color documents. Since the user determines a recording medium depending on the image or material to be printed thereon, it is important to generate color proof CPa in view of the above elements or factors of the recording medium.

Another problem is that a peculiar pattern (hereinafter referred to as an "image structure" or a "false pattern") caused by an interference stripe such as moiré, a rosette image, or the like which appears on a printed color document cannot be reproduced in the image on the hard copy.

If such a false pattern actually appears on a printed color document, then it should also accurately be reproduced on a color proof CPa. Generally speaking, the conventional color proof CPa which fails to reproduce a false pattern thereon cannot be said as a truthful proof for a printed color document.

It is believed that no false pattern can be reproduced on a hard copy produced by the DP 3 because the Neugebauer's equation is a kind of theory of probability.

SUMMARY OF THE INVENTION

It is a general object of the present invention to provide a method of and an apparatus for producing a color proof truthfully depending on a recording medium composed of a print sheet and printing inks that will be used to produce a printed color document.

A major object of the present invention is to provide a method of and an apparatus for producing a color proof which accurately reproduces a false pattern such as moiré or the like that is to appear on a high-resolution printed color document, with a relatively inexpensive and relatively low-resolution color printer.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a diagram showing the matrix structure of an anti-aliasing filter;

FIG. 9 is a diagram illustrative of a standard deviation LUT for correcting a threshold matrix according to recording mediums;

DETAILED DESCRIPTION OF THE PREFERRED EMBODIMENTS

Figure 1:
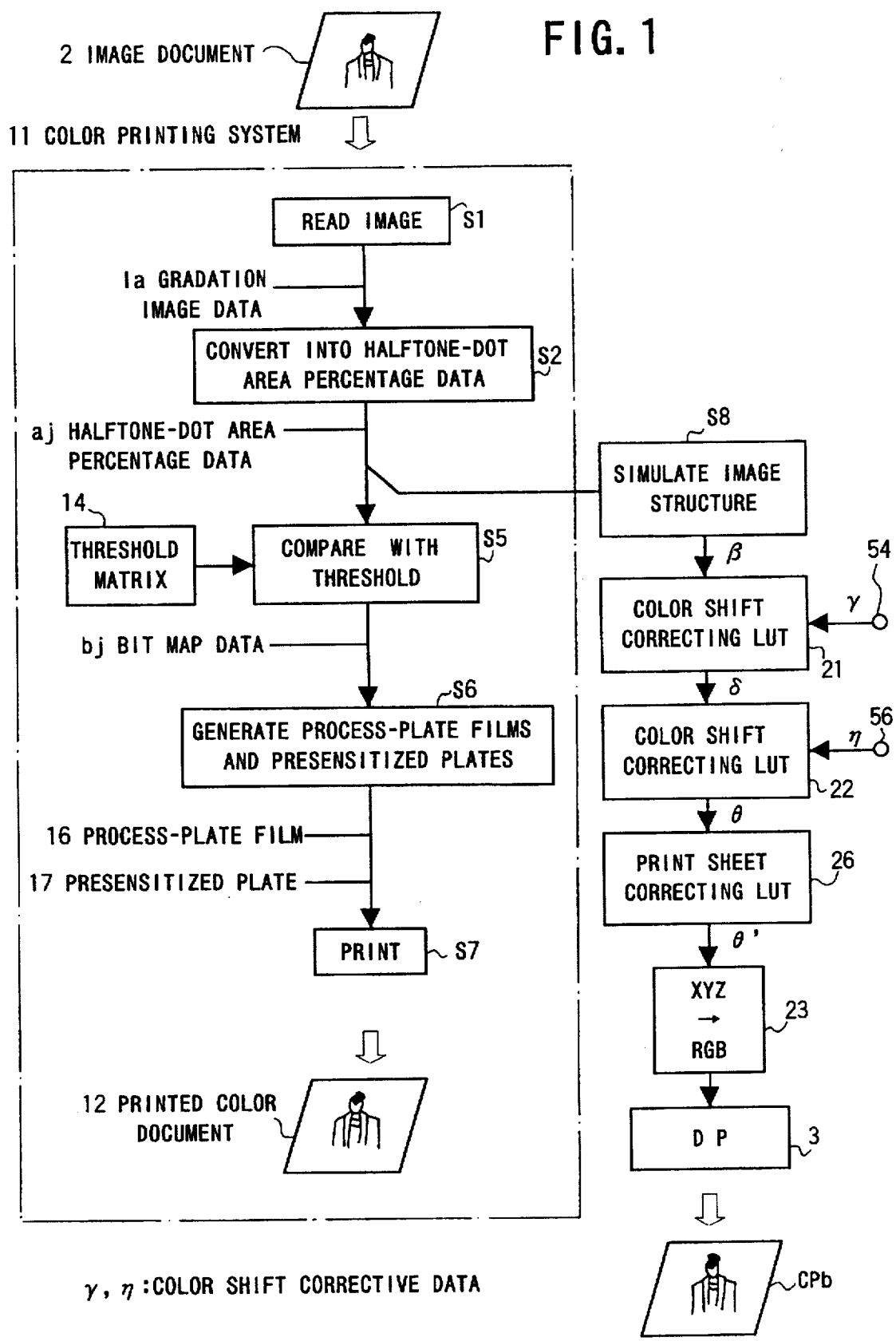
FIG. 1 is a flowchart of a process of producing a color proof with respect to a printed color document, the process including a processing sequence according to an embodiment of the present invention.

A method of and an apparatus for producing a color proof according to the present invention will be described below with reference to the accompanying drawings. Those parts or steps shown in FIGS. 1 through 11A, 11B which are identical to those shown in FIG. 12 are denoted by identical reference characters, and will not be described in detail below.

FIG. 1 shows a process of producing a color proof CPb with a color digital printer (DP) 3 according to an embodiment of the present invention, with respect to a printed color document 12 which is produced by a general color printing system 11.

The general color printing system 11 will first be described below.

In the general color printing system 11, an image on an image document 2 is read by an image reader such as a color scanner having a CCD area sensor or the like, and gradation image data Ia of each of the colors R (red), G (green), and B (blue) are generated from the read image in a step S1. The CCD area sensor or the like has a resolution which may be selected to be of 400 DPI (Dots Per Inch), for example. One dot corresponds to one pixel according to a density gradation process (continuous tone process) with 256 gradations or the like.

The pixel data of the gradation image data Ia of RGB are then converted by a color conversion process into halftone-dot area percentage data aj of the four plates of respective colors C (cyan), M (magenta), Y (yellow), and K (black) in a step S2. The color conversion process has various versions depending on different color printing machines, as described later on. If no UCR (Under-Color Removal) process is carried out, then the gradation image data Ia of RGB may be converted into halftone-dot area percentage data aj of the three plates of colors C, M, Y. If the color Y is not present on a printed color document 12, then the gradation image data Ia of RGB may be converted into halftone-dot area percentage data aj of the two plates of colors C, M.

Four threshold matrixes (also called "threshold templates") 14 having a resolution of about 2000 DPI (in the illustrated embodiment, a resolution of 1600 DPI for an easier understanding) and a desired screen angle and screen ruling with respect to each of the four plates C, M, Y, K are referred to for comparing each threshold of each element of the threshold matrixes 14 with the values of the gradation image data Ia, thereby converting the values of the gradation image data Ia into binary data having a value of "0" or "1", i.e., bit map data bj, in a step S5. The screen angles of the threshold matrix 14 for the plate Y and the threshold matrix 14 for the plate M, for example, have an angle difference of 45° or the like. Actually, the screen angles of the threshold matrix 14 for the four plates C, M, Y, K have angle differences of 75°, 45°, 0°, 15° or the like from a reference. The screen ruling is 175 in this embodiment.

Figure 2:
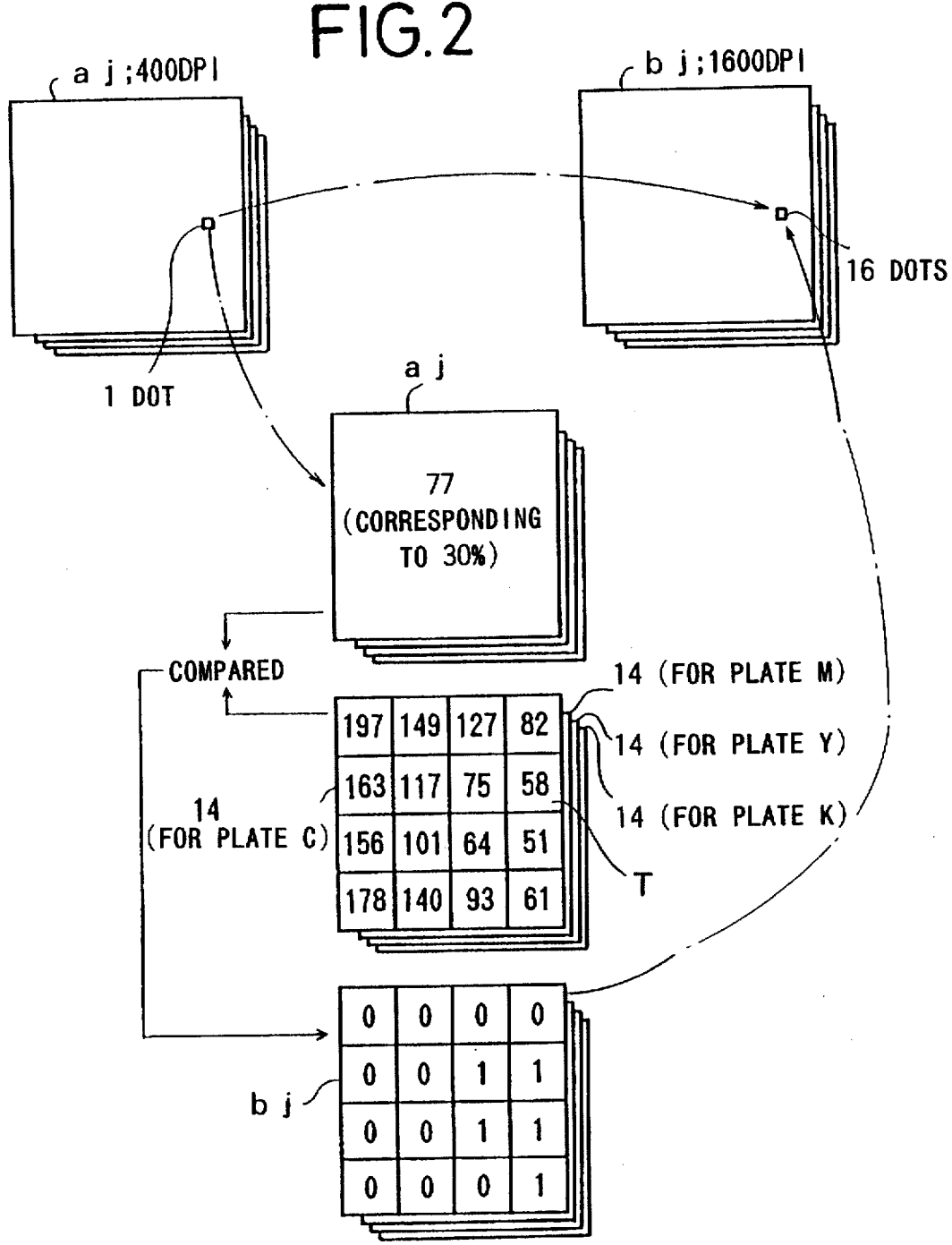
FIG. 2 is a diagram illustrative of the generation of general bit map data for producing a printed color document, in the process shown in FIG. 1.

FIG. 2 schematically shows the threshold matrixes 14, etc. for illustrating the generation of bit map data in the step S5.

In FIG. 2, a process shown between two uppermost blocks illustrates a conversion from one dot of halftone-dot area percentage data aj of 400 DPI into 16 dots of bit map data bj of 1600 DPI.

If one dot of halftone-dot area percentage data aj belongs to the plate C, for example, and the value of the halftone-dot area percentage data aj is represented by 256 gradations, with aj=77 (corresponding to 30% according to the percentage representation), then it is compared with the threshold matrix 14 for the plate C. The threshold matrix 14 is composed of thresholds T arranged in a convolutional pattern in the matrix elements. While the threshold matrix 14 will not be described in detail as it has no direct bearing on the present invention, it is hypothetically established and produced by extracting and reconstructing corresponding portions of a threshold matrix which corresponds to one halftone dot where the thresholds T of 8-bit gradations of 0, 1, 2, ... , 254, 255 are arranged in a convolutional pattern from the center, or a so-called supercell (one threshold matrix corresponding to nine halftone dots).

As is well known in the art, the generation of bit map data bj, i.e., the conversion of the values of the gradation image data Ia into binary data, is carried out according to the following formulas (3), (4):

$$aj > T \rightarrow 1 \quad (3)$$

$$aj < T \rightarrow 0 \quad (4)$$

In this manner, the bit map data bj corresponding to the pixel of the plate C, i.e., the pixel whose halftone-dot area percentage data aj is aj=77), shown in a lowermost block in FIG. 2, are generated. As described above, the threshold matrixes 14 for the plates M, Y, K have respective screen angles selectable with respect to the threshold matrix 14 for the plate C.

The bit map data bj are then processed by a plurality of such machines as a photographic exposing machine, an automatic image developing machine, etc. in a step S6 (FIG. 1), producing four process-plate films 16 having halftone dot images as block copies and presensitized plates 17 as printing plates.

Finally, using the presensitized plates 17, a printed color document 12 composed of a halftone dot image is produced by a color printing machine having a rotary presses according to a printing process in a step S7.

The halftone dot image on the printed color document 12 contains an interference stripe, known as a so-called image structure, such as moiré, a rosette image, or the like which does not appear on the image document 2 and which is caused by the threshold matrixes 14 having different screen angles, and the printed color document 12 has a peculiar finish such as a coarse surface finish, a gloss finish, color variations, etc. owing to the nature of the print sheet and printing inks that are used.

According to the present invention, the peculiar finish that the printed color document 12 produced by the general color printing system 11 has due to its recording medium is accurately reproduced on the color proof CPb.

The image structure of the printed color document 12 can accurately be reproduced when an image structure simulation process (described in detail later on) is carried out in a step S8.

Since a color shift occurs when the image structure is reproduced, a color shift correcting look-up table (LUT) 21 is required to correct such a color shift. A color shift correcting LUT 22 is also required to correct a color shift which is produced because a color reproduction range of the DP 3 and a color reproduction range of the color printing machine differ from each other (Usually, the color reproduction range of the DP 3 is smaller than the color reproduction range of the color printing machine).

Data corrected by the color shift correcting LUTs 21, 22 are common color space data described above. The common color space data are corrected depending on the print sheet using a print sheet correcting LUT 26 as described in detail later on, and thereafter converted into color space data inherent in the DP 3 by a LUT 23. The color space data thus converted are supplied to the DP 3, which then generates the color proof CPb which accurately reproduces the image structure and colors.

Generation of the color shift correcting LUTs 21, 22 will now be described below.

Figure 3:
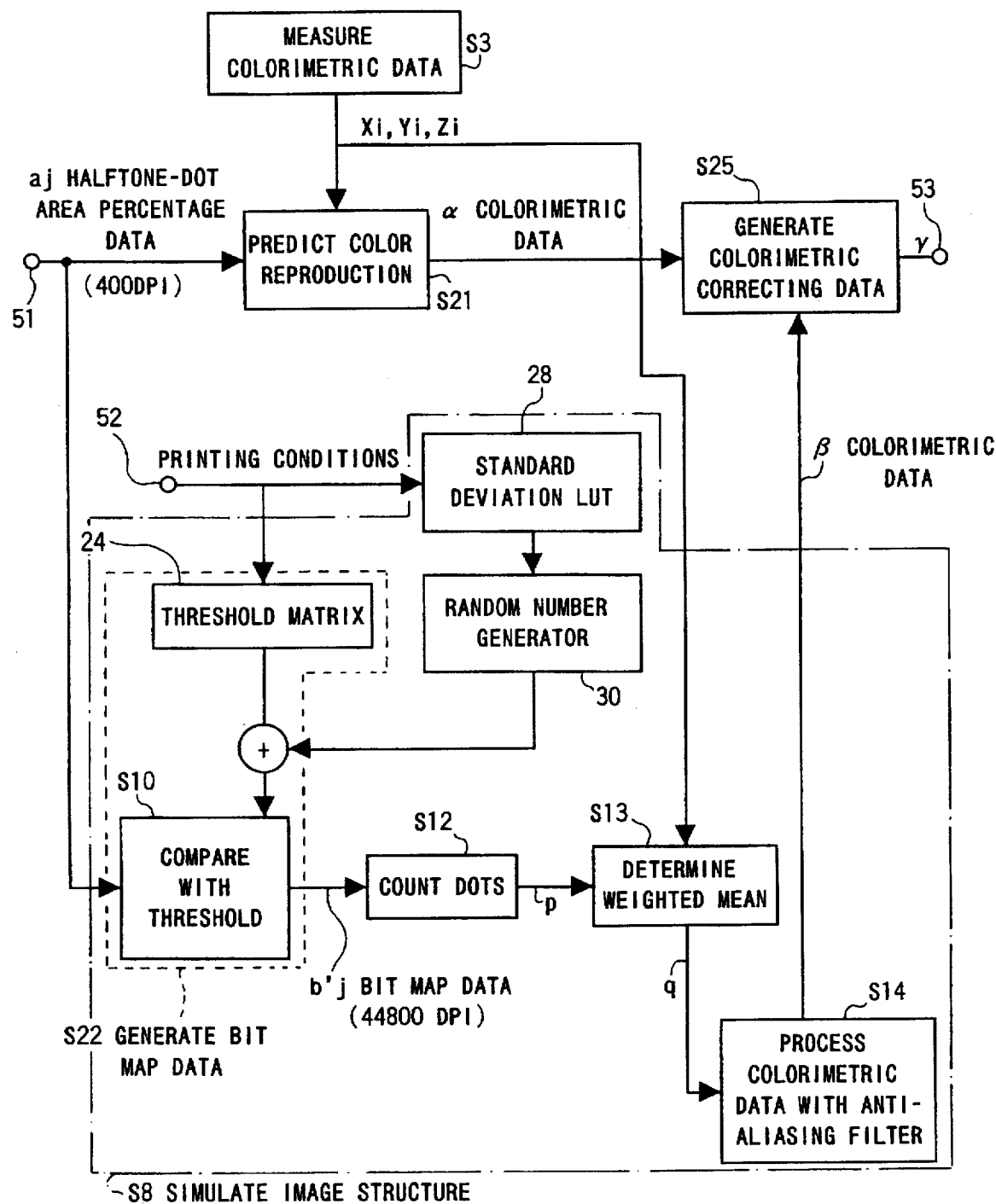
FIG. 3 is a block diagram of an arrangement for generating a color shift correcting look-up table for correcting a color shift produced by an image structure simulation.

FIG. 3 shows an arrangement for generating the color shift correcting LUT 21 for correcting a color shift produced by the image structure simulation process in the step S8.

For generating the color shift correcting LUT 21, a color reproduction predicting process in a step S21 and the image structure simulation process in the step S8 are first carried out.

The color reproduction predicting process in the step S21 may be the process using the Neugebauer's equation, as described above, or a process in which when the halftone-dot area percentage data aj of each of the four plates C, M, Y, K are varied by a given value (%), a plurality of color samples printed on the printed color document 12 are measured by a colorimeter, and colorimetric data in a CIE colorimetric system of each of the color samples, e.g., colorimetric data Xi, Yi, Zi which are tristimulus value data, are determined by an interpolation process, after which a look-up table or corrective function composed of the colorimetric values measured by the colorimeter and the colorimetric data determined by the interpolation process, which are addressable by the halftone-dot area percentage data aj as input data, is produced. In either of these processes, it is necessary at least to measure the colorimetric data Xi, Yi, Zi (i represents $2^4=16$ colors for the four plates C, M, Y, K) for each color with a colorimeter (see a step S3 in FIG. 10).

In the color reproduction predicting process in the step S21, colorimetric data α are obtained according to the equations (1), (2) and using the colorimetric data Xi, Yi, Zi, with respect to the halftone-dot area percentage data aj having a resolution of 400 DPI which are supplied from an input terminal 51 (see FIG. 3).

In the image structure simulation process in the step S8, bit map data peculiar to the image structure simulation process are generated in a step S22.

Specifically, threshold matrixes 24 whose resolution is higher than the resolution of the threshold matrixes 14 shown in FIG. 2 are selected depending on the screen ruling and screen angles which are the same as those of printing conditions supplied from an input terminal 52. The threshold matrixes 24 are selected in order to increase the resolution of bit map data b'j. Since the screen ruling and screen angles of the threshold matrixes 24 are necessarily the same as those of the printing conditions for reproducing moiré, etc., the screen ruling of the threshold matrixes 24 is 175, and the screen angles of the of the threshold matrixes 24 for the plates C, M, Y, K have angle differences of 75°, 45°, 0°, 15° or the like from a reference, as described above.

In order to increase the resolution, the threshold matrixes 24 for generating halftone dots have elements 256×256= 65536. The threshold in each of the elements may take either one of values of 1, 2, 3, . . . , 255, for example. The threshold matrixes 24 and the halftone-dot area percentage data aj are compared with each other, thus generating bit map data b'j in a step S10.

The bit map data b'j for the plates C, M, Y, K have a resolution of 44800 (256×175) DPI.

Then, the bit map data b'j of 44800 DPI are converted into data of 1600 DPI. For converting the bit map data b'j of 44800 DPI, a counting process is carried out in a step S12 by counting 28×28 (=784) dots of the bit map data b'j and converting them into one dot of count data p.

Figure 4A:
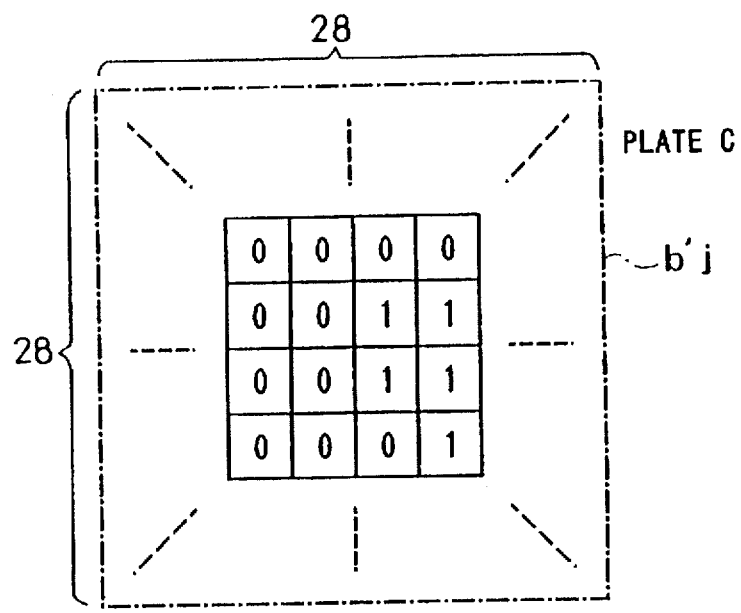
FIGS. 4A and 4B are diagrams illustrative of the generation of average colorimetric data from relatively high-resolution bit map data for producing a printed color document, in the process shown in FIG. 1.
Figure 4B:
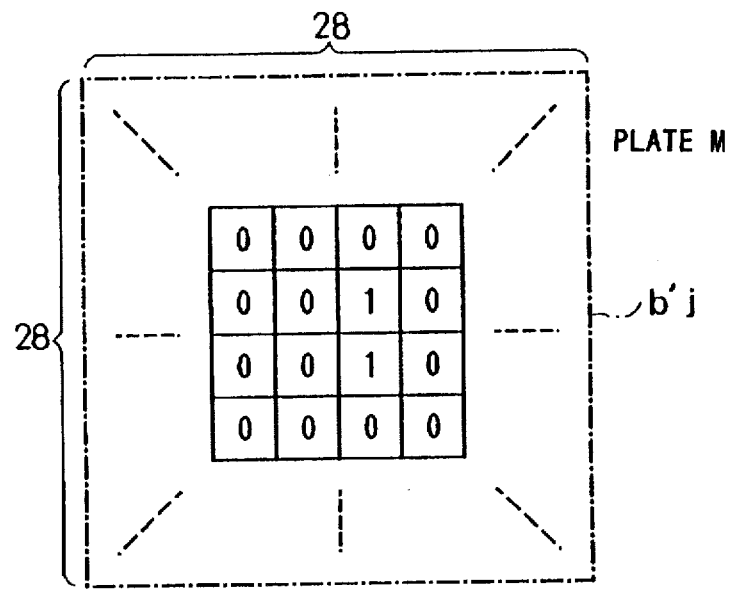

For illustrating the counting process in the step S12, 28×28 dots of the bit map data b'j for the plate C are shown in FIG. 4A, and 28×28 dots of the bit map data b'j for the plate M are shown in FIG. 4B. It is assumed that all non-illustrated elements in FIGS. 4A and 4B value of a value of "0" and all elements of the remaining bit map data b'j for the plates Y, K also have a value of "0".

With respect to the 28×28 dots, the bit map data b'j for the four plates C, M, Y, K (in this example, the bit map data b'j for the two plates C, M) are simultaneously referred to, and area percentages ci for the respective colors, i.e., the $2^4=16$ colors because there are four plates, are counted.

For the pixels (corresponding to 28×28 dots) shown in FIGS. 4A and 4B, the area percentages ci for the respective colors are calculated as follows:

Color C; $ci=c_c=3/784$ (The area percentage $c_c$ represents an area where only the color C is present when the colors C, M are superposed and viewed in a transmissive manner, and an area where the colors C, M are superposed is represented by the area percentage $c_{C+M}$ of the color C+M=B.)

Color C+M; $C_{C+M}=2/784$

Color W; $C_w=779/784$ (This area percentage $C_w$ represents an area where neither the color C nor the color M is present when the colors C, M are superposed and viewed in a transmissive manner.)

Remaining colors (13 colors such as the colors Y, K, etc.); The area percentage ci of these remaining colors is nil.

When the area percentage ci per each group of 28×28 dots is thus generated, the count data p (each element value is represented by the area percentage ci) of 1600 DPI are generated.

Then, the colorimetric data Xi, Yi, Zi (i represents $2^4=16$ colors for the four plates C, M, Y, K) of each of the 16 colors printed by the printed color document 12, which have been measured by the colorimeter in the step S3, are processed into colorimetric data q (tristimulus value data X, Y, Z) using the area percentages ci for the respective colors counted in the step S12 as a weighting coefficient, according to the equation (5) given below in a step S13. Stated otherwise, the weighted mean of the colorimetric data Xi, Yi, Zi is calculated with the area percentages ci for the respective colors, thus determining tristimulus value data X, Y, Z (colorimetric data q).

$$
\begin{aligned}
X &= \Sigma ci \cdot Xi \\
&= (3/784)X_C + (2/784)X_{C+M} + (779/784)X_W \\
Y &= \Sigma ci \cdot Yi \\
&= (3/784)Y_C + (2/784)Y_{C+M} + (779/784)Y_W \\
Z &= \Sigma ci \cdot Zi \\
&= (3/784)Z_C + (2/784)Z_{C+M} + (779/784)Z_W
\end{aligned}
\tag{5}
$$

When the counting process in the step S12 and the weighted-mean determining process in the step S13 for each group of 784 (28×28) dots are carried out in the full range of the bit map data b'j of 44800 DPI, the colorimetric data q of 1600 DPI are obtained.

Then, the obtained colorimetric data q of 1600 DPI are processed by an anti-aliasing filter AF shown in FIG. 5 into colorimetric data β (tristimulus value data X, Y, Z) of 400 DPI which is equal to the resolution of the DP 3 in a step S14.

The anti-aliasing filtering process in the step S14 is inserted to avoid, in advance, aliasing noise which would be introduced due to the resolution of the DP 3 when the color proof CPb is to be generated with the resolution (400 DPI in this embodiment) of the DP 3. For effectively carrying out the anti-aliasing filtering process, it is necessary that the resolution of the image data (the colorimetric data q) which is an original signal to be processed by the anti-aliasing filter AF be higher than the resolution (400 DPI) of the DP 3. In this embodiment, the resolution of the image data (the colorimetric data q) to be processed by the anti-aliasing filter AF is set to 1600 DPI.

The structure of a matrix (a square matrix of n×n elements) of the anti-aliasing filter AF shown in FIG. 5 will be analyzed below.

Generally, for converting the colorimetric data q which are image data having a resolution of 1600 DPI into the colorimetric data β which are image data having a resolution of 400 DPI, since one dot of 400 DPI corresponds to 16 dots of 1600 DPI, the minimum number of elements of a filter with no anti-aliasing capability is 4×4.

To minimize aliasing noise, the number of elements of the anti-aliasing filter AF should preferably be as large as possible, but is limited by the operating speed, hardware, etc. thereof.

As can be analogized from the fact that color information can be reproduced by the Neugebauer's equation, the anti-aliasing filter AF is required to have such frequency characteristics that it will produce as small an insertion loss as possible in the vicinity of DC components because it is necessary for the anti-aliasing filter AF to pass components of relative low frequencies including DC components. Therefore, the response of the anti-aliasing filter AF at the center of the matrix should ideally be 0 dB.

An interference stripe component such as of moiré, i.e., a component which is ½ or less of the screen frequency (screen ruling) component, should remain unremoved in its entirety after the anti-aliasing filtering process in the step S14.

The anti-aliasing filter AF should be designed also in view of the fact that if the attenuation curve of the anti-aliasing filter AF is sharp, then a new false pattern will appear due to the anti-aliasing filtering process.

The structure of the anti-aliasing filter AF shown in FIG. 5 is composed of 9×9 elements designed in view of the above considerations. If the elements are represented by "dij", then the sum of the values (also called filter coefficients) of the respective elements dij need to be 1.0. Therefore, the actual value of each of the elements dij is divided by the sum ($\Sigma dcij$) of elements dcij.

The filter coefficients of the anti-aliasing filter AF thus constructed are arranged such that, as shown in FIG. 5, its frequency characteristics provide a bell-shaped attenuation pattern which is monotonously reduced from the center toward the outer edges.

Figure 6:
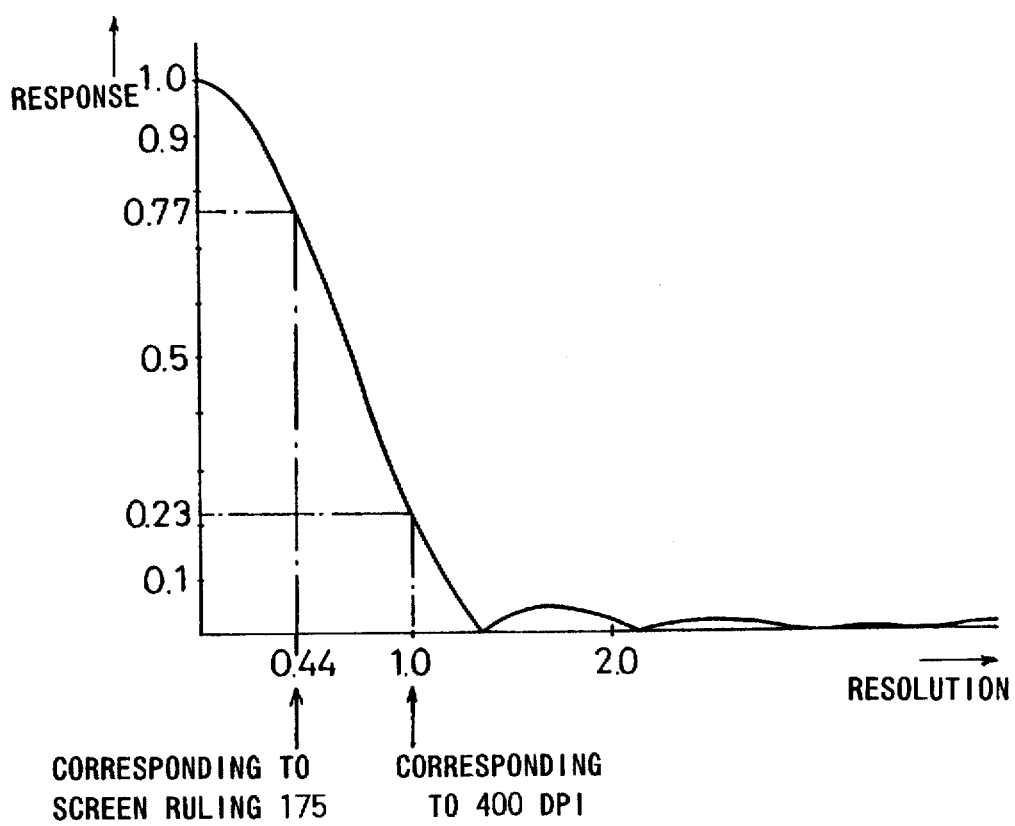
FIG. 6 is a diagram showing the frequency response of the anti-aliasing filter.

FIG. 6 shows the frequency characteristics of the anti-aliasing filter AF. In FIG. 6, the horizontal axis represents the resolution of the anti-aliasing filter AF with a value of 1.0 standardized by the resolution Ra=400 DPI of the DP 3. The screen ruling of 175 which is the screen frequency is standardized at a value of 0.44. The vertical axis in FIG. 6 represents the response of the anti-aliasing filter AF with a central element $d_{55}=121$ being standardized at a value of 1.0.

As can be seen from FIG. 6 that the anti-aliasing filter AF shown in FIG. 5 has a response of about 0.23 at the resolution of 1.0, and a response of about 0.77 at the resolution of 0.44.

As a result of an analysis of various examples, it has been understood that if the response is 0.5 (50%) or more when the resolution is equal to or less than the screen frequency (corresponding to the screen ruling) and if the response is 0.3 (30%) or less when the resolution is equal to or more than the resolution of 1.0 of the color digital rinter (DP) 3, then an interference stripe such as moiré appearing on the printed color document 12 can be reproduced on the color proof CPb, and any aliasing noise can be made small enough not to be visually recognized.

The structure of the matrix (the square matrix of n×n (9×9) elements) of the anti-aliasing filter AF has been described above.

Figure 7A:
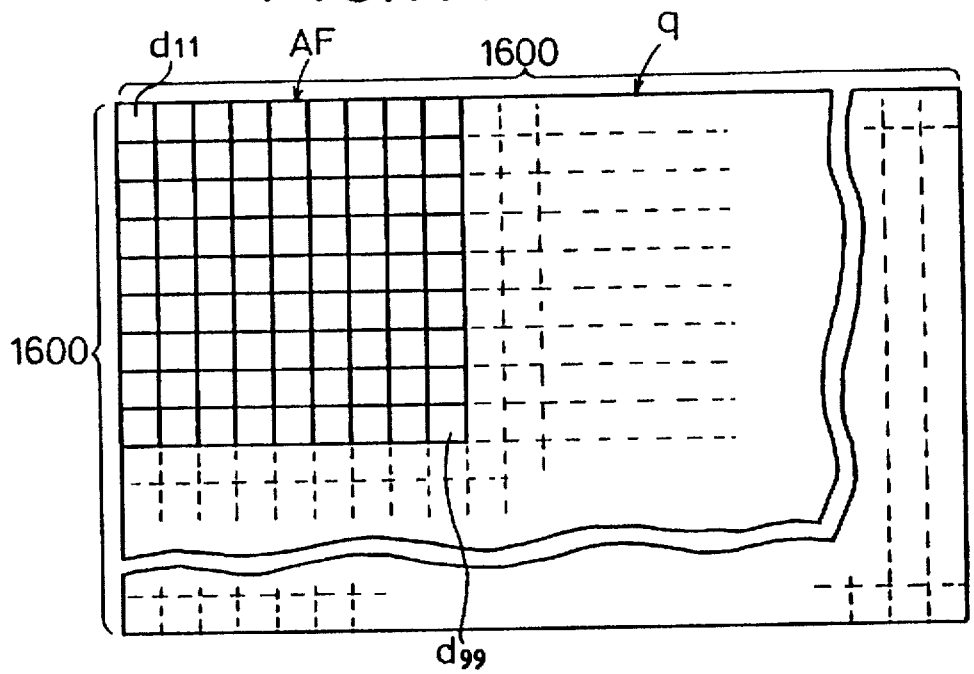
FIGS. 7A and 7B are diagrams illustrating the manner in which the colorimetric data are processed by the anti-aliasing filter.
Figure 7B:
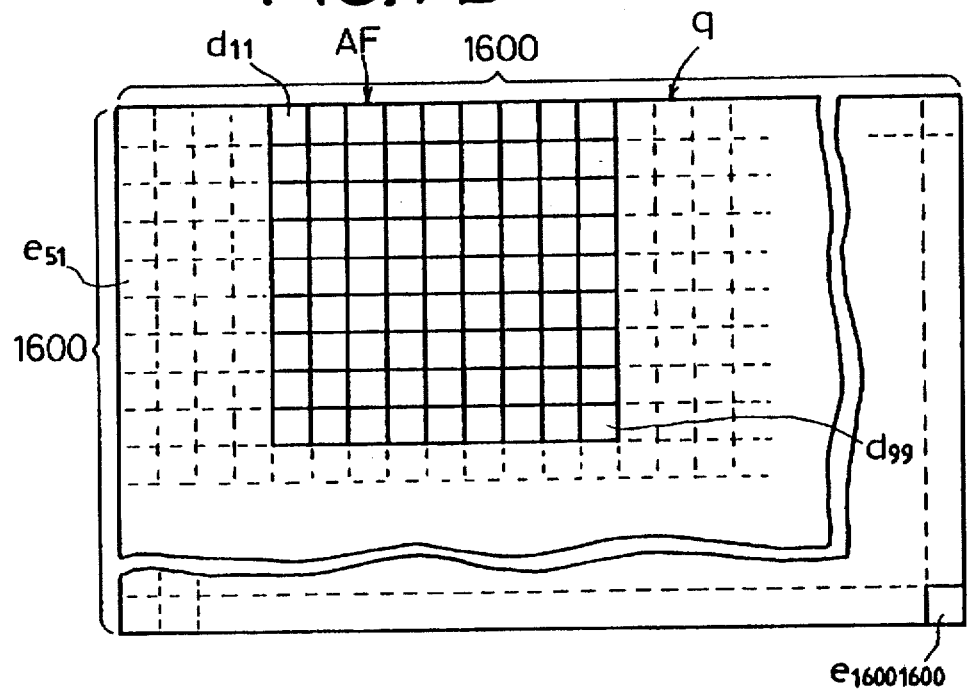

FIGS. 7A and 7B are illustrative of the manner in which the colorimetric data are processed by the anti-aliasing filter AF. As shown in FIG. 7A, 9×9 dots in an upper left portion of the colorimetric data q of 1600 DPI are associated with the anti-aliasing filter AF of the 9×9 matrix whose elements are represented by dij as shown in FIG. 5, and the corresponding elements are multiplied, after which the sum of the products is determined. In this manner, the anti-aliasing filtering process is carried out. More specifically, if each of the elements of the colorimetric data q is represented by eij, then $\Sigma(dij \times eij)$ (for the 9×9 elements) is calculated, and used as colorimetric data $\beta$ having a resolution of 400 DPI. While the sum of the anti-aliasing filter AF is standardized at $\Sigma dij=1$ as described above, since multiplications involving decimal fractions are time-consuming, the values shown in FIG. 5 may be used as the values of the elements of the anti-aliasing filter AF, which are then represented by d'ij, and $\Sigma(d'ij \times eij)/\Sigma d'ij$ may be determined as a value produce as a result of the anti-aliasing filtering process.

Because the anti-aliasing filtering process converts colorimetric data q having a resolution of 1600 DPI into colorimetric data $\beta$ having a resolution of 400 DPI, the second anti-aliasing filtering process on the colorimetric data q may be carried out by shifting the anti-aliasing filter AF by 4 dots of the colorimetric data q to the right, for example, as shown in FIG. 7B. Similarly, the anti-aliasing filtering process is successively effected by shifting the anti-aliasing filter AF by 4 dots. After the anti-aliasing filtering process is carried out in a position equal to the right-hand end of the colorimetric data q, a fifth element $e_{51}$ from above shown in FIG. 7B is associated with an element $d_{11}$ of the anti-aliasing filter AF, and then anti-aliasing filtering process is successively effected by shifting the anti-aliasing filter AF by 4 dots until an element $e_{1600\,1600}$ is associated with an element $d_{99}$. In this fashion, the colorimetric data q of 1600 DPI can be converted into the colorimetric data $\beta$ of 400 DPI with its resolution reduced from the resolution of the colorimetric data q. The anti-aliasing filtering process may be defined as a filtering process for cutting off a spatial frequency response inherent in the DP 3 while maintaining a spatial frequency response inherent in the printing screen for the color printed material 12.

Then, color shift corrective data $\gamma$ for correcting a color shift caused by the image structure simulation process in the step S8 are generated from the colorimetric data $\beta$ generated in the step S8 and the colorimetric data generated in the step S21, in a step S25 (see FIG. 3). The color shift corrective data $\gamma$ which appear at an output terminal 53 shown in FIG. 3 can be obtained by a simple mathematical calculation as a colorimetric data difference $\beta-\alpha$ ($=\gamma$) or a colorimetric data ratio $\alpha/\beta(=\gamma)$.

When the color shift corrective data $\gamma$ thus generated are supplied from an input terminal 54 shown in FIG. 1, the color shift correcting LUT 21 can be generated.

The generation of the color shift correcting LUT 21 for correcting a color shift caused by the image structure simulation process in the step S8 has been described above.

Figure 8:
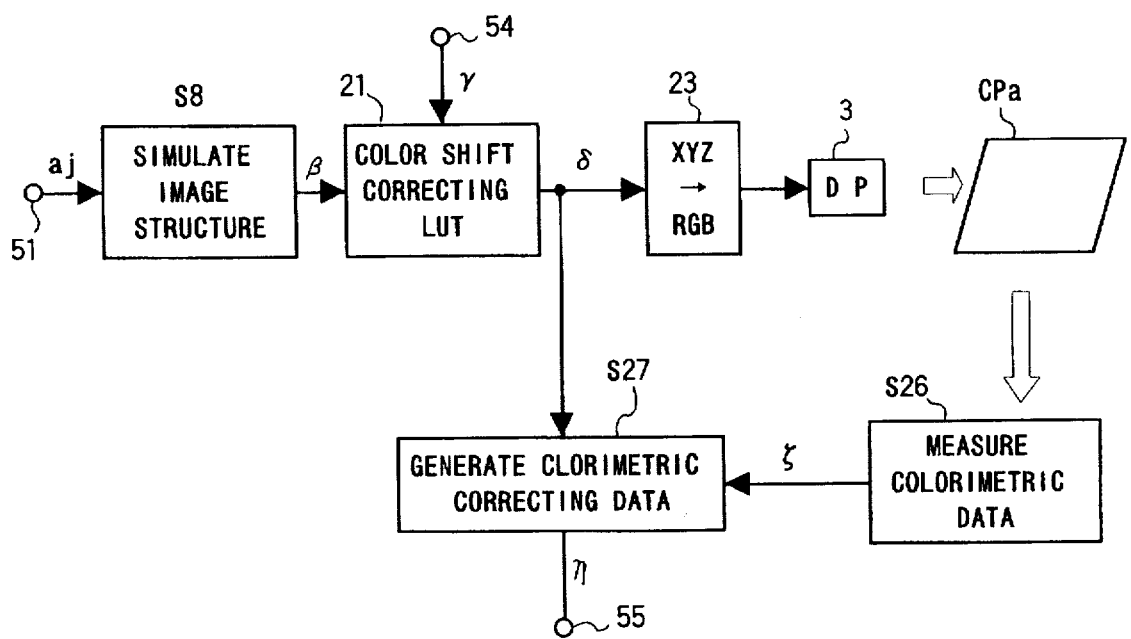
FIG. 8 is a block diagram illustrative of the generation of color shift corrective data upon use of a color printer.

FIG. 8 is illustrative of the generation of color shift corrective data LUT 22 for correcting a color shift that is produced when the DP 3 which has a smaller color reproduction range than the color reproduction range of the color printed document 12 is used.

The halftone-dot area percentage data aj supplied to an input terminal 51 are converted into colorimetric data $\beta$ by the image structure simulation process in the step S8, and corrected colorimetric data $\delta$ (for example, $\delta=\beta-\gamma=\alpha$, or $\delta=\beta\times\gamma=\alpha$) are produced by correcting a color shift caused by the image structure simulation process with the color shift correcting LUT 21.

Since the corrected colorimetric data $\delta$ are common color space data, which may for example be tristimulus data X, Y, Z, they are converted into color space data inherent in the DP 3, i.e., RGB data in this case, with the LUT 23. Based on the RGB data thus produced, a preliminary print proof CPa is generated as a hard copy by the DP 3.

Then, the preliminary print proof CPa is measured by a colorimeter, producing colorimetric data $\zeta$ in a step S26. Color shift corrective data $\eta$ for correcting a color shift caused by the use of the DP 3 are generated from the colorimetric data ζ and the colorimetric data δ in a step S27. The color shift corrective data η which appear at an output terminal 55 can also be obtained by a simple mathematical calculation as a colorimetric data difference δ−ζ(=η) or a colorimetric data ratio ζ/δ (=ζ).

When the color shift corrective data η thus generated are supplied from an input terminal 56 shown in FIG. 1, the color shift correcting LUT 22 can be generated.

For generating the printed color document CPb subsequently to the above preparatory procedure, a color shift caused by the image structure simulation process in the step S8 is corrected by the color shift correcting LUT 21, thus producing colorimetric data δ, and then a color shift caused by the use of the DP 3 is corrected by the color shift correcting LUT 22, thus producing colorimetric data θ which are free of color shifts.

The color printing system 11 shown in FIG. 1 employs a certain print sheet and printing inks that are specified by the user for use as the printed color document 12. The print sheet has its own coarse surface finish, gloss finish, or property that determines the manner in which printing inks are spread thereon, depending on the type of the print sheet. The printing inks may produce different printed conditions depending on the selected print sheet. The DP 3 which produces the printed color document CPb usually poses certain limitations on the types of print sheets and printing inks that can be used therewith. For these reasons, it is practically impossible to produce the printed color document CPb with the same recording medium as the recording medium that is used in the color printing system 11.

According to this embodiment, when the halftone-dot area percentage data aj are converted into bit map data in the step S22 in the image structure simulation process in the step S8, the threshold matrixes 24 are adjusted depending on the print sheet and the printing inks as shown in FIG. 3.

Specifically, the manner in which the printing inks are spread on the print sheet depends on the surface characteristics of the print sheet used and/or the type of the printing inks used. The manner in which the printing inks are spread on the print sheet is visually recognized as a microscopic behavior of pixels of the printed color document 12. As shown in FIG. 9, the manner in which the printing inks are spread on the print sheet is established as a parameter relative to combinations of print sheets and printing inks. Values of the parameter are experimentally determined, and stored in a standard deviation LUT 28 as a standard deviation SD for limiting a range in which random numbers RN vary. The standard deviation SD shown in FIG. 9 is of values when the halftone-dot area percentage data aj range from 0 to 255. If the halftone-dot area percentage data aj are in the range from 0 to 100%, then the standard deviation SD is set to SD/2.55.

When printing conditions depending on the print sheet and the printing inks are determined, the standard deviation SD as the corresponding parameter is selected from the standard deviation LUT 28, and supplied to a random number generator 30 (see FIG. 3). The random number generator 30 generates random numbers RN whose average is 0 and which is in the variation range according to the standard deviation SD, and adds the random numbers RN to the threshold matrixes 24. The thresholds T (i, j) of the threshold matrixes 24 are now corrected as:

$$T(i,j)=T(i,j)+RN(SD) \quad (6)$$

and compared with the halftone-dot area percentage data aj in the step S10. As a result, it is possible to obtain bit map data b'j which reflects the manner in which the printing inks are spread on the print sheet.

According to the present embodiment, after the bit map data b'j which includes the manner in which the printing inks are spread on the print sheet are generated, they are processed by the counting process in the step S12, the weighted-mean determining process in the step S13, the anti-aliasing filtering process in the step S14, and the color shift correcting processes with the color shift correcting LUTs 21, 22. Thereafter, the corrected data are further corrected in a global range depending on the type of the print sheet, using the print sheet correcting LUT 26.

The printed color document 12 has a peculiar finish depending on the scattering of light on the surface thereof, (which may be visually perceived as a coarse surface finish, a gloss finish, or the like), and also depending on density variations due to local thickness differences of the sheet. Corrective data for reproducing the peculiar finish depending on these print sheet properties are measured in advance, and stored in the print sheet correcting LUT 26. Since the peculiar finish of the printed color document 12 is visually recognized as a coarse surface finish in a relatively large area spreading equally over the entire surface of the printed color document 12, it can be reproduced by processing halftone dot data.

The print sheet correcting LUT 26 is generated, for example, by producing a solid color image having a halftone-dot area percentage of 100% with a resolution of 1600 DPI on a given print sheet, and measuring the density of each of the pixels in a certain area of the solid color image, thus producing colorimetric data Y (i, j). For example, if a sheet of coat or art paper is used, then the density of each of 189×189 pixels in a square area of 3 mm ×3 mm is measured, producing a matrix of measured values. If a sheet of wood-free paper is used, then density of each of 630×630 pixels in a square area of 1 cm×1 cm is measured, producing a matrix of measured values. Thereafter, the densities of the pixels in the given area are averaged, and the ratio of the measured value of each of the pixels to the average density is determined, and used as corrective data MY (i, j). If a sheet of coat paper is used, then (i, j) is in the range from (0, 0) to (188, 188). The corrective data MY (i, j) are established with respect to each of the print sheets, and stored in the print sheet correcting LUT 26.

The colorimetric data θ (=X (i, j), Y (i, j), Z (i, j) whose color shifts have been corrected by the color shift correcting LUTs 21, 22 are corrected by the print sheet correcting LUT 26 depending on the print sheet used, according to the following equation (7):

$$X'(i,j)=X(i,j) \cdot MY(i,j)$$

$$Y'(i,j)=Y(i,j) \cdot MY(i,j)$$

$$Z'(i,j)=Z(i,j) \cdot MY(i,j) \quad (7)$$

As a consequence, it is possible to obtain colorimetric data θ (=X' (i, j), Y' (i, j), Z' (i, j) which are capable of producing a finish depending on the print sheet. The corrective data MY (i, j) in the equation (7) are of a value with respect to the tristimulus value data Y which indicate the brightness of light. However, the corrective data may be established with respect to each of the tristimulus value data X, Y, Z.

The colorimetric data θ' thus corrected are then converted into RGB data by the LUT 23 (see FIG. 1). An image on a hard copy that is generated by the DP 3 based on the RGB data, i.e., a color proof CPb, has its colors in conformity with those of the printed color document 12, and the image structure of a halftone dot image can be reproduced on the color proof CPb. The color proof CPb thus reproduces thereon an interference stripe such as moiré, a rosette image, or the like which is substantially the same as that which appears on the printed color document 12, i.e., an image structure. The color proof CPb also reproduces a finish that depends on the print sheet and the printing ink used.

Though the resolution of the DP 3 has a relatively low value of 400 DPI, it is possible to reproduce, on the printed color document 12, substantially the same interference stripe such as moiré, a rosette image, or the like as that which appears on the printed color document 12 produced by a color printing machine having a resolution of 2000 DPI (which is assumed to be 1600 DPI in this embodiment). The colors of the printed color document 12 can accurately be reproduced on the color proof CPb by the color reproduction predicting process and the color shifting correcting process. The color proof CPb can thus easily and inexpensively be generated.

Because of the anti-aliasing filtering process, it is possible to remove aliasing noise (also called a false pattern due to a beat on the image) produced owing to the resolution of the DP 3, i.e., a false image structure based on the interference between the screen period due to the DP 3 and the resolution of the printer (the resolution of the DP 3).

In the above embodiment, since the anti-aliasing filtering process is carried out, threshold matrixes 24 having a resolution of 48000 DPI higher than the resolution of 2000 DPI of the printed color document 12 are referred to in the counting process in the step S12. If the anti-aliasing filtering process is not carried out, however, the counting process may be carried out using threshold matrixes having a resolution equivalent to the resolution of 2000 DPI (which is assumed to be 1600 DPI in this embodiment) of the printed color document 12.

Figure 10:
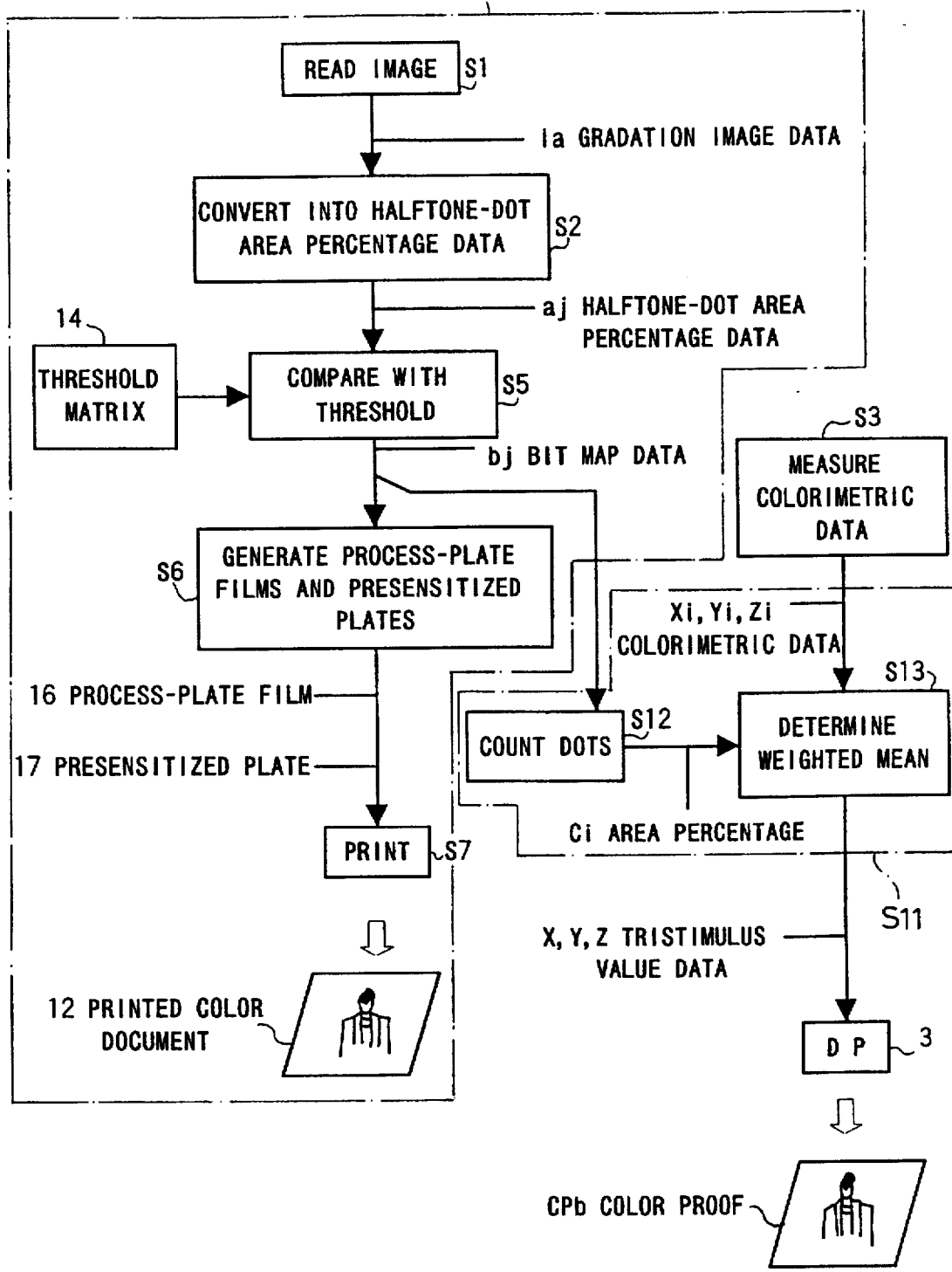
FIG. 10 is a flowchart of another counting process.

FIG. 10 shows such a modified counting process. Those parts or steps shown in FIG. 10 which are identical to those shown in FIGS. 1 through 9 are denoted by identical reference characters, and will not be described in detail below.

The comparing process (bit map data generating process) in the step S5 shown in FIG. 10 is the same as the process which has been described above with reference to FIG. 2.

For an easier understanding, the DP 3 is assumed to have a resolution of 400 DPI. Therefore, 16 dots of bit map data bi corresponding to one bit of the DP 3, i.e., one pixel.

Figure 11A:
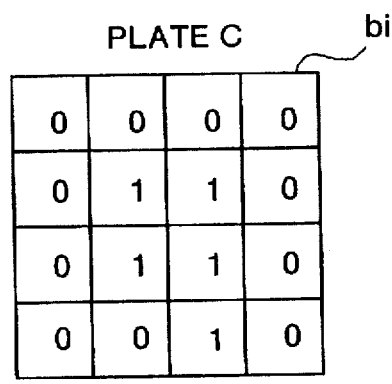
FIG. 11A is a diagram of bit map data of one pixel of a plate C.
Figure 11B:
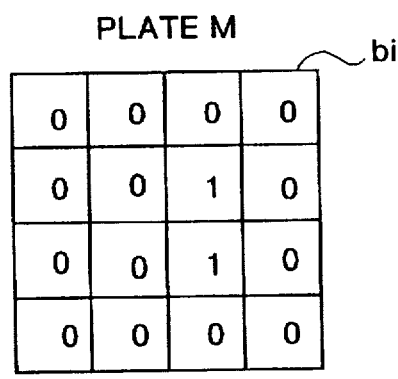
FIG. 11B is a diagram of bit map data of one pixel of a plate M.
Figure 12:
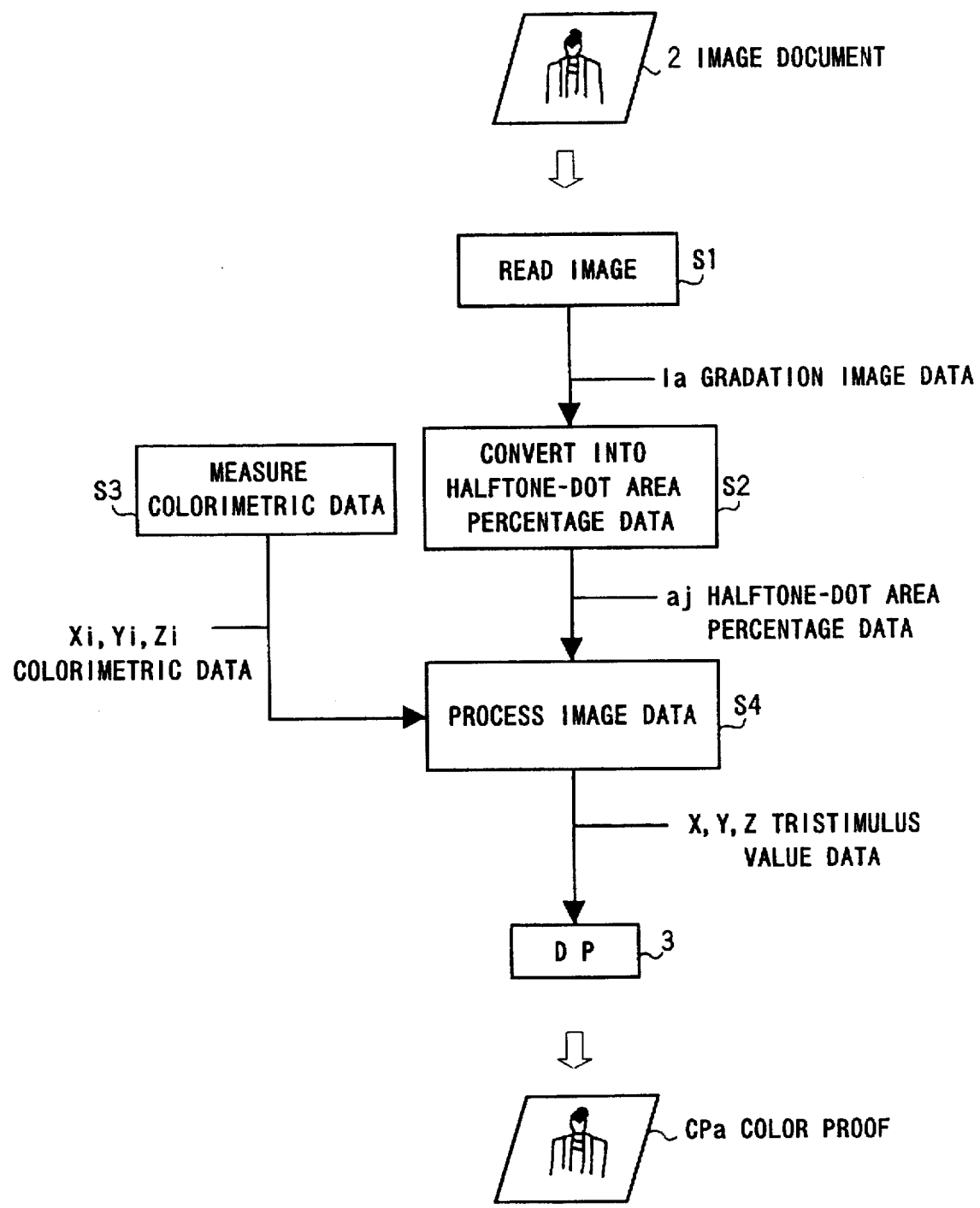
FIG. 12 is a flowchart of a conventional process of producing a color proof.

FIGS. 11A and 11B show bit map data bi for plates C, M which correspond to one pixel of the DP 3. It is assumed that all elements of remaining bit map data bi for plates Y, K have a value of "0". The bit map data bi of plates C, M are the same as those shown in FIG. 2.

With respect to each of the pixels of the DP 3, the bit map data bi of the four plates C, M, Y, K (here, the bit map data bi for plates C, M) are simultaneously referred to, and the area percentage ci for each color (each of the $2^4$ colors because there are four plates) is counted in the counting process in the step S12. For the pixel shown in FIGS. 11A and 11B, the area percentage ci of each color is calculated as follows:

Color C; $ci=c_c=3/16$ (When the colors C, M are superposed and viewed in a transmissive manner, an area where the colors C, M are superposed is represented by the area percentage $C_{C+M}$ of the color C+M=B.)

Color C+M; $C_{C+M}=2/16$

Color W; $C_w=11/16$ (This area percentage represents an area where neither the color C nor the color M is present when the colors C, M are superposed and viewed in a transmissive manner.)

Remaining colors (13 colors such as the colors Y, K, etc.); The area percentage ci of these remaining colors is nil.

Then, the colorimetric data Xi, Yi, Zi (i represents $2^4$=16 colors for the four plates C, M, Y, K) of each of the 16 colors printed by the printed color document 12, which have been measured by the colorimeter in the step S3, are processed into tristimulus value data X, Y, Z, which are average colorimetric data, using the area percentages ci for the respective colors counted in the step S12 as a weighting coefficient, according to the equation (8) given below in a step S13. Stated otherwise, the weighted mean of the colorimetric data Xi, Yi, Zi is calculated with the area percentages ci for the respective colors, thus determining new tristimulus value data X, Y, Z.

$$\begin{aligned} X &= \Sigma ci \cdot Xi \\ &= (3/16)X_C + (2/16)X_{C+M} + (11/16)X_W \\ Y &= \Sigma ci \cdot Yi \\ &= (3/16)Y_C + (2/16)Y_{C+M} + (11/16)Y_W \\ Z &= \Sigma ci \cdot Zi \\ &= (3/16)Z_C + (2/16)Z_{C+M} + (11/16)Z_W \end{aligned} \qquad (8)$$

The new tristimulus value data X, Y, Z thus generated are supplied to the DP 3 shown in FIG. 10. The DP 3 converts the new tristimulus value data X, Y, Z, i.e., the common color space data, into pixel data for the three primaries relative to the LEDs or the like, i.e., inherent color spaced data, with look-up tables (LUTs), and thereafter generates a color proof CPb as a hard copy with an image formed on a sheet. The LUTs or converting means (conversion tables) for converting the common color space data into the inherent color spaced data may be positioned outside of the DP 3.

The color proof CPb thus generated accurately reproduces thereon a false pattern such as moiré, a rosette image, or the like which are substantially the same as that appearing on the printed color document 12.

Though the resolution of the DP 3 has a relatively low value of 400 DPI, it is possible to reproduce, on the color proof CPb, substantially the same interference stripe such as moiré, a rosette image, or the like as that which appears on the printed color document 12 produced by a color printing machine having a resolution of 2000 DPI.

Stated otherwise, the color proof CPb which accurately reproduces thereon the false pattern appearing on the printed color document 12 can be generated inexpensively through a simple arrangement. The colors of the printed color document 12 can also be reproduced with accuracy because the colorimetric data Xi, Yi, Zi are used.

In the above embodiments, the tristimulus value data X, Y, Z are generated using the colorimetric data Xi, Yi, Zi. However, average colorimetric data may be generated using chromaticity data or density data. At any rate, average colorimetric data in the common color space may be generated using data measured in a device-independent color space (the common color space).

The present invention is applicable to threshold matrixes 14 in which halftone dots are arranged at random, i.e., so-called FM screens, for the generation of a color proof.

An image on a color proof CPb actually generated by the DP 3 ("Pictrography 3000" manufactured by Fuji Photo Film Co., Ltd.) using the Neugebauer's equation, an image on a printed sheet actually generated by a color printing machine, and an image on a color proof CPb actually generated according to the embodiment of the present invention were compared with each other. The color proof CPb actually generated according to the embodiment of the present invention accurately reproduces a false pattern such as moiré, a rosette image, or the like which appears on the printed sheet actually generated by the color printing machine, and also reproduces a coarse finish and a jump finish closer to those on the printed sheet actually generated by the color printing machine than the color proof CPb actually generated by the DP 3 using the Neugebauer's equation. The printed color document which was compared had a screen ruling of 175, and screen angles of 0°, 15°, 45°, 45°, and 75° for the four plates C, M, Y, K.

While the DP 3 is employed as an image output device in the above embodiment, the DP 3 may be replaced with a color monitor having a bit map memory and a bit map display.

According to the present invention, as described above, when threshold matrixes are corrected depending on the type of the print sheet and/or the printing inks that are used on a printed color document, or when data converted into bit map data are corrected depending on the print sheet, a color proof which exhibits a finish equivalent to the finish of the printed color document is accurately and easily generated by a relatively inexpensive image output device having a low resolution.

Furthermore, when threshold data are corrected using a given parameter depending on the type of the print sheet and/or the printing inks that are used on a printed color document, a color proof can be generated which has a microscopic finish depending on the type of the print sheet and/or the printing inks. When image data are processed by corrective data for reproducing the surface conditions of the print sheet, a color proof can be generated which has a global finish depending on the print sheet.

According to the present invention, when pixel data to be inputted to a color printer are to be generated, no Neugebauer's equation is used, but bit map data are used from a novel viewpoint. The image data thus generated are supplied to the color printer, and a color proof generated by the color printer accurately reproduces thereon a false pattern such as moiré, a rosette image, or the like inherent in a printed color document.

The bit map data are used from a novel viewpoint because whereas it has heretofore been believed that a false pattern of a printed color document of about 2000 DPI cannot be reproduced by a color printer having a low resolution of about 400 DPI, the principles of the present invention are based on a novel arrangement or concept in that as a result of efforts to reproduce such a false pattern with a color printer having a low resolution of about 400 DPI, the area percentage of each of the colors is counted depending on the pixels of the color printer using bit map data, and used as a weighting coefficient for colorimetric data for calculating average colorimetric data.

The reason why a false pattern is reproduced according to the present invention is as follows: A false pattern is potentially generated when halftone-dot area percentage data for at least three plates including three primaries are converted into bit map data using threshold matrixes having different screen angles. Therefore, a false pattern can be reproduced by reproducing a color proof with a color printer which has a string of pixels having a shorter period than the period of the false pattern that is potentially generated.

Furthermore, the anti-aliasing filter process which is carried out according to the present invention is capable of removing a beat (an interference between the screen period and the resolution of the color printer) which is a by-product of image processing while maintaining a false pattern such as moiré or the like that is significant information. Inasmuch as a false pattern such as moiré or the like is a defect that is necessarily created in a printing process using halftone dots, it is necessary to reproduce such a false pattern on a color proof. Nevertheless, a beat which is a by-product of a simulation process and has no bearing on a printing process should not be produced.

Although certain preferred embodiments of the present invention have been shown and described in detail, it should be understood that various changes and modifications may be made therein without departing from the scope of the appended claims.

What is claimed is:

1. A method of producing a color proof by converting halftone-dot area percentage data into bit map data by comparison with threshold data, and generating a color proof for a printed color document based on the bit map data with an image output device, comprising the steps of:

establishing the threshold data based on a parameter depending on at least one of (1) a recording medium composed of a print sheet, and (2) of printing inks, of the printed color document;

converting the halftone-dot area percentage data into the bit map data using the threshold data thus established; and producing the color proof based on said bit map data;

wherein said threshold data are established by processing given threshold data with a random number that is established according to standard deviation data which is said parameter and depends on a finish of an image recorded on said recording medium.

2. A method of producing a color proof by converting halftone-dot area percentage data into bit map data by comparison with threshold data, and generating a color proof for a printed color document based on the bit map data with an image output device, comprising the steps of:

establishing corrective data based on a parameter depending on a print sheet of the printed color document;

correcting the bit map data with said corrective data; and producing the color proof based on the bit map data thus corrected wherein said corrective data are established as data of a ratio of an average density of an image recorded on the print sheet to local densities thereof.

3. An apparatus for producing a color proof by converting halftone-dot area percentage data into bit map data by comparison with threshold data, and generating a color proof for a printed color document based on the bit map data with an image output device, comprising:

standard deviation data holding means for holding standard deviation data depending on a finish of an image recorded by a recording medium composed of a print sheet and/or printing inks of the printed color document;

random number generating means for generating a random number having a standard deviation according to said standard deviation data;

threshold data holding means for holding threshold data; and means for selecting standard deviation data, controlling the standard deviation of the random number according to the selected standard deviation data, and correcting the threshold data based on the random number.

4. A method of producing a color proof with a color printer which forms an image per pixel based on pixel data of input image data according to a density gradation process, comprising the steps of:

referring to threshold matrixes with respect to respective halftone-dot area percentage data generated from an image document for at least three plates including three primaries to convert the halftone-dot area percentage data for the three plates into respective bit map data;

simultaneously referring to the bit map data for the at least three plates with respect to respective pixels of the color printer to count area percentages of respective colors ($2^n$ colors when the number of plates is n);

processing predetermined colorimetric data of the respective colors with the counted area percentages as a weighting coefficient, thereby calculating average colorimetric data; and using said average colorimetric data as the pixel data of the input image data.

5. A method according to claim 4, wherein said halftone-dot area percentage data for at least three plates comprise halftone-dot area percentage data for three plates of colors C, M, Y or halftone-dot area percentage data for four plates of colors C, M, Y, K.

6. A method according to claim 4, wherein chromaticity data of the respective colors or density data of the respective colors are used as said colorimetric data of the respective colors.

7. A method according to claim 4, wherein the color printer has a resolution which is lower than the resolution of the bit map data.

8. A method of producing a color proof with a color printer which forms an image per pixel based on pixel data of input image data according to a density gradation process, for a printed color document produced by a color printing machine, comprising the steps of:

referring to threshold matrixes, having a resolution higher than the resolution of the printed color document, with respect to respective halftone-dot area percentage data generated from an image document for at least three plates including three primaries to convert the halftone-dot area percentage data for the three plates into respective bit map data;

simultaneously referring to the bit map data for the at least three plates to count area percentages of respective colors ($2^n$ colors when the number of plates is n) in a given range of the bit map data;

processing predetermined colorimetric data of the respective colors with the counted area percentages as a weighting coefficient, thereby calculating first average colorimetric data;

processing said first average colorimetric data successively with an anti-aliasing filter in a range greater than the pixels of the color printer to convert the first average colorimetric data into second average colorimetric data corresponding to the pixels of the color printer; and using said second average colorimetric data as the pixel data of the input image data.

9. A method according to claim 8, wherein the color printer has a resolution higher than a screen ruling of the printed color document.

10. A method according to claim 8, wherein said anti-aliasing filter has such characteristics as to attenuate components having frequencies higher than the resolution of the color printer to 30% or less, and leave 50% or more of components having frequencies lower than the screen ruling of the printed color document.

11. A method according to claim 8, wherein said threshold matrixes contain threshold data established based on a parameter depending on a recording medium composed of a print sheet and/or printing inks of the printed color document.

12. A method according to claim 8, wherein said threshold matrixes contain threshold data established based on a parameter depending on a recording medium composed of a print sheet and/or printing inks of the printed color document, said threshold data being produced by processing given threshold data with a random number which is established according to standard deviation data which is said parameter depending on a finish of an image recorded by said recording medium.

* * * * *